United States Patent Office 2,898,341
Patented Aug. 4, 1959

2,898,341
ORGANIC PHOSPHORIC AND THIOPHOSPHORIC ACID ESTERS

Richard Sehring and Karl Zeile, Ingelheim, Germany, assignors to C. H. Boehringer Sohn, Ingelheim, Germany, a partnership No Drawing. Application November 22, 1957
Serial No. 698,067

Claims priority, application Germany November 22, 1956

10 Claims. (Cl. 260—294.8)

This invention relates to organic phosphoric and thiophosphoric acid esters, and more particularly to olefinic organic esters of phosphoric and thiophosphoric acid having the general structural formula

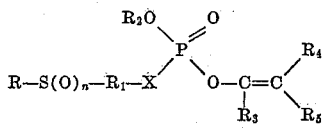

wherein R is a branched or straight chain alkyl radical with 1 to 6 carbon atoms, an aryl radical which may be substituted, an aralkyl radical which may be substituted or a heterocyclic radical, such as pyridyl, pyrimidyl or oxazolyl; $R_1$ is an alkylene radical; $R_2$ is an alkyl radical with 1 to 4 carbon atoms; $R_3$ is hydrogen or an alkyl radical with 1 to 3 carbon atoms; $R_4$ is halogen, hydrogen, an alkyl radical with 1 to 3 carbon atoms or a carbalkoxy radical; $R_5$ is halogen, hydrogen or an alkyl radical; X is oxygen or sulfur; and $n$ is an integer from 1 to 2, inclusive.

It is well known that organic esters of phosphoric and thiophosphoric acid having the general structural formula

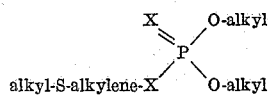

wherein X represents sulfur or oxygen are capable of being oxidized with halogen or hypochlorous acid or its salts and in the presence of water to form organic esters containing sulfoxyl groups having the general structural formula

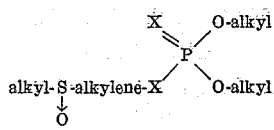

wherein X also represents sulfur or oxygen.

Similarly, it is well known that by reacting O,O-diethyl-O-dichlorovinyl-phosphate with a halogen, the halogen attaches itself to the vinyl radical and transforms the olefinic bond into a saturated bond. For example, when O,O-diethyl-O-tetrachloro-phosphate reacts with chlorine, the following reaction takes place:

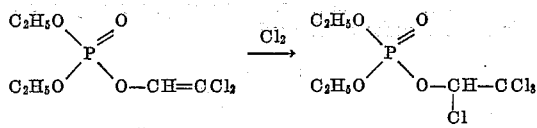

We have now discovered that olefinic organic esters of phosphoric or thiophosphoric acid containing sulfoxyl or sulfonyl groups and having the general structural formula

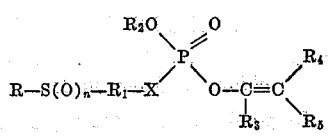

wherein R, $R_1$, $R_2$, $R_3$, $R_4$, $R_5$, X and $n$ have the meaning above defined, may be obtained by oxidizing an olefinic organic ester of phosphoric or thiophosphoric acid having the structural formula

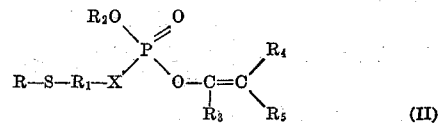

wherein R, $R_1$, $R_2$, $R_3$, $R_4$, $R_5$ and X have the same meaning as defined in Formula I above with an oxidizing agent, such as chlorine, bromine, hypochlorous acid, hypobromous acid, salts of hypochlorous or hypobromous acid, or hydrogen peroxide.

The surprising aspect of the reaction according to the present invention is that instead of the expected saturation of the vinyl radical, the olefinic carbon-to-carbon bond in the starting compounds having the Formula II above remains intact upon reaction thereof with oxidizing agents, especially with chlorine and bromine, while merely the mercapto group is oxidized to a sulfoxyl or sulfonyl group.

The oxidation reaction in accordance with the present invention may be carried out in water as a reaction medium, in which case the reaction mixture is preferably vigorously agitated while adding the oxidizing agent. The reaction may, however, also be carried out in an alcoholic-aqueous medium or in a mixture of water and an inert organic solvent. An example of a suitable alcoholic-aqueous reaction medium is 80% methanol. Chlorinated hydrocarbons have been found to be particularly effective as operative inert organic solvents.

The oxidizing agent is gradually added to the mixture consisting of the ester having the structural Formula II and the aqueous reaction medium. During the oxidation reaction the mixture is maintained at a temperature between —20 and +20° C. After the addition of the calculated quantity of oxidizing agent has been completed, the reaction mixture is allowed to stand for about one hour at slightly higher temperatures, that is between 10 and 50° C., in order to permit the oxidation reaction to go to ultimate completion. Thereafter, the water and any alcohol or organic solvent present in the reaction mixture are removed by fractional distillation, leaving behind a colorless, non-distillable oil.

The quantity of oxidizing agent to be employed depends upon the degree of oxidation which is to be achieved on the sulfur of the mercapto group; in other words it depends on whether a sulfoxyl group or a sulfonyl group is to be formed. Thus, it is necessary to employ the exact molar quantity of oxidizing agent which is theoretically required to transform the mercapto group into a sulfoxyl group or a sulfonyl group. If more than the theoretical amount required to form a sulfonyl group is used, the olefinic carbon-to-carbon bond is attacked by the oxidizing agent.

The compounds obtained in accordance with the present invention have excellent insecticidal properties and are marked by very low toxicity in humans and other warm-blooded animals. They are insecticidally active as contact poisons as well as stomach poisons against all types of insects, such as flies, mosquitoes, cockroaches, plant lice, beetles, spiders and so forth.

The novel organic phosphoric and thiophosphoric acid esters may be used as active insecticidal agents alone or in combination with other insecticides or pesticides, for example as active insecticidal ingredients in insecticide powders, suspensions, emulsions, sprays, aerosols or pastes. Similarly, they may be applied in full strength or in diluted form to solid inert carriers, such as shredded cellulose, or to solid materials which simultaneously act as bait, such as sugar.

The following examples will further illustrate the present invention and enable others skilled in the chemical art to understand the invention more completely. It should be understood, however, that we do not wish to limit the invention to the particular examples given below.

EXAMPLE I

*O-(ethyl-sulfoxyl-ethyl) - O - methyl-O-β,β-dichlorovinyl-phosphate*

29.5 gm. O-(ethyl-mercapto-ethyl)-O-methyl-O-β,β-dichlorovinyl-phosphate were dissolved in 100 cc. 80% methanol. Thereafter, 7.5 gm. chlorine were slowly introduced into the solution while vigorously stirring the reaction solution and maintaining its temperature between 15 and 20° C. After all of the chlorine had been introduced, the reaction mixture was allowed to stand for one hour at 25° C. Subsequently, the methanol and the water were distilled off in vacuo, leaving behind 30 gm. of a colorless, non-distillable oily product, which was analyzed to have the structural formula $$\begin{array}{c} CH_3-O \\ \phantom{CH_3-}\diagdown \\ C_2H_5-S-C_2H_4O-P=O \\ \phantom{C_2H_5-}\downarrow \phantom{-C_2H_4O-P}\diagdown \\ \phantom{C_2H_5-}O \phantom{-C_2H_4O-P-}O-CH=CCl_2 \end{array}$$

The yield was 96.5% of the theoretical yield.

EXAMPLE II

*O-(ethyl-sulfoxyl-ethyl) - O - methyl-O-β,β-dichlorovinyl-phosphate*

29.5 gm. O-(ethyl-mercapto-ethyl)-O-methyl-O-β,β-dichlorovinyl-phosphate were dissolved in 100 cc. methylene chloride. 25 gm. sodium bicarbonate and 100 cc. water were added to the solution. 18 gm. bromine were slowly added dropwise to the resulting mixture, while vigorously agitating the mixture and maintaining it at a temperature between 0 and 10° C. After all of the bromine had been added, the reaction mass was allowed to stand for one half hour at 30° C. Subsequently, the methylene chloride was removed by vacuum distillation and the aqueous layer was separated in a separatory funnel. The residual oily product was dried with sodium sulfate. Analysis showed that it had the structural formula shown in Example I above. The yield was 16 gm., which corresponds to 51.4% of the theoretical yield.

EXAMPLE III

*O-(ethyl-sulfoxyl-ethyl) - O - methyl-O-β,β-dichlorovinyl-phosphate*

11 gm. 32% hydrogen peroxide were added dropwise to 29.5 gm. O-(ethyl-mercapto-ethyl)-O-methyl-O-β,β-dichlorovinyl-phosphate, while maintaining the mixture at a temperature between −10 and 0° C. After all of the hydrogen peroxide had been added, the reaction mass was allowed to stand for one hour at 15° C. Subsequently, the water removed by vacuum distillation, leaving behind 25 gm. of a colorless, non-distillable oily product having the structural formula shown in Example I above. The yield was 80.4% of the theoretical yield.

EXAMPLE IV

*O-(ethyl-sulfonyl-ethyl)-O-methyl-O-β,β-dichlorovinyl-phosphate*

29.5 gm. O-(ethyl-mercapto-ethyl)-O-methyl-O-β,β-dichlorovinyl-phosphate were dissolved in 100 cc. 80% methanol, and 14.5 gm. chlorine were introduced slowly into the resulting solution while keeping the same at a temperature between 15 and 20° C. Thereafter, the reaction mixture was allowed to stand for one hour at a temperature between 20 and 25° C. At the end of this period the methanol and the water were distilled off in vacuo, leaving behind 30 gm. of a colorless, non-distillable oily product which had the structural formula $$\begin{array}{c} CH_3-O \\ \phantom{CH_3-}\diagdown \\ C_2H_5-SO_2-C_2H_4O-P=O \\ \phantom{C_2H_5-SO_2-C_2H_4O-}\diagdown \\ \phantom{C_2H_5-SO_2-C_2H_4O-P-}O-CH=CCl_2 \end{array}$$

The yield was 92% of the theoretical yield.

EXAMPLE V

*O-(phenyl-sulfoxyl-ethyl) - O - methyl-O-β,β-dichloro-vinyl-phosphate*

34.3 gm. O-(phenyl-mercapto-ethyl)-O-methyl-O-β,β-dichlorovinyl-phosphate were dissolved in 100 cc. 90% methanol, and 7.5 gm. chlorine were slowly introduced into the solution while maintaining it at a temperature between 15 and 20° C. Thereafter, the reaction mixture was allowed to stand for one hour at a temperature between 20 and 25° C. The methanol and the water were then distilled off, leaving behind 34 gm. of a colorless, non-distillable oily product having the structural formula $$\begin{array}{c} CH_3-O \\ \phantom{CH_3-}\diagdown \\ C_6H_5-S-C_2H_4O-P=O \\ \phantom{C_6H_5-}\downarrow \phantom{-C_2H_4O-P}\diagdown \\ \phantom{C_6H_5-}O \phantom{-C_2H_4O-P-}O-CH=CCl_2 \end{array}$$

The yield was 94.7% of the theoretical yield.

EXAMPLE VI

*O-(p-chloro-phenyl-sulfoxyl-ethyl) - O - ethyl-O-β,β-dichlorovinyl-phosphate*

39.2 gm. O-(p-chloro-phenyl-mercapto-ethyl)-O-ethyl-O-β,β-dichlorovinyl-phosphate were dissolved in 100 cc. 90% methanol. 7.5 gm. chlorine were slowly introduced into the solution while maintaining it at a temperature between 15 and 20° C. After all of the chlorine had been introduced, the reaction mixture was allowed to stand at a temperature between 20 and 25° C. for one hour. Subsequently, the methanol and the water were distilled off, leaving benhind 37 gm. of a colorless, non-distillable oily product having the structural formula $$\begin{array}{c} C_2H_5-O \\ \phantom{C_2H_5-}\diagdown \\ Cl-C_6H_4-S-C_2H_4-O-P=O \\ \phantom{Cl-C_6H_4-}\downarrow \phantom{-C_2H_4-O-P}\diagdown \\ \phantom{Cl-C_6H_4-}O \phantom{-C_2H_4-O-P-}O-CH=CCl_2 \end{array}$$

The yield was 90.8% of the theoretical yield.

EXAMPLE VII

*O-(phenyl-sulfoxyl-ethyl) - O - ethyl-O-isopropenyl-phosphate*

30.2 gm. O-(phenyl-mercapto-ethyl)-O-ethyl-O-isopropenyl-phosphate were dissolved in 100 cc. 80% methanol. 7.5 gm. chlorine were then slowly introduced into the solution while maintaining it at a temperature between 10 and 15° C. Subsequently the reaction mixture was allowed to stand for one hour at about 20° C. Thereafter, the methanol and the water were distilled off, leaving behind a colorless, non-distillable oily product having the structural formula $$\begin{array}{c} C_2H_5-O \\ \phantom{C_2H_5-}\diagdown \\ C_6H_5-S-C_2H_4-O-P=O \\ \phantom{C_6H_5-}\downarrow \phantom{-C_2H_4-O-P}\diagdown \phantom{-O-}CH_3 \\ \phantom{C_6H_5-}O \phantom{-C_2H_4-O-P-}O-C=CH_2 \end{array}$$

The yield was 95% of the theoretical yield.

EXAMPLE VIII

*O-(p-chlorophenyl-sulfonyl-ethyl) - O - ethyl-O-β,β-dichlorovinyl-phosphate*

39.2 gm. O-(p-chlorophenyl-mercapto-ethyl)-O-ethyl-

O-β,β-dichlorovinyl-phosphate were dissolved in 100 cc. 80% methanol. 14.5 gm. chlorine were then slowly introduced into the solution while maintaining the same at a temperature of about 10° C. Thereafter, the reaction mixture was allowed to stand at 10° C. for one hour. Subsequently, the methanol and the water were distilled off, leaving behind a colorless, non-distillable oily product having the structural formula

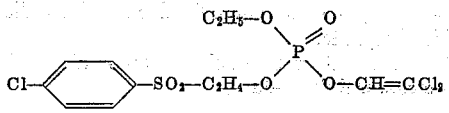

The yield was 94.2% of the theoretical yield.

EXAMPLE IX

Following the procedure described in Example VIII, but using only 7.5 gm. chlorine, 0.1 mol O-(p-chlorophenyl-mercapto-ethyl) - O - ethyl-O-α-methyl-β-carbethoxy-vinyl-phosphate was converted into O-(p-chlorophenyl-sulfoxyl-ethyl) - O - ethyl-O-α-methyl-β-carbethoxy-vinyl-phosphate having the structural formula

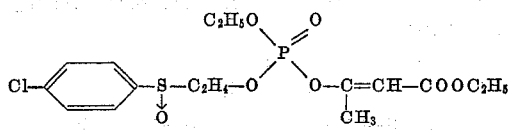

The yield was 93.6% of the theoretical yield.

EXAMPLE X

Following the procedure described in Example VIII, but using only 7.5 gm. chlorine, 0.1 mol O-(p-nitrophenyl-mercapto-ethyl) - O - ethyl-O-β,β-dichlorovinyl-phosphate was converted into O-(p-nitrophenyl-sulfoxyl-ethyl)-O-ethyl-O-β,β-dichlorovinyl-phosphate having the structural formula

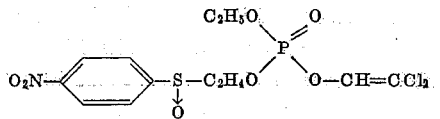

The yield was 90% of the theoretical yield.

EXAMPLE XI

Following the procedure described in Example VIII, 0.1 mol O-(ethyl-mercapto-ethyl)-O-ethyl-O-isopropenyl-phosphate was converted into O-(ethyl-sulfonyl-ethyl)-O-ethyl - O - isopropenyl-phosphate having the structural formula

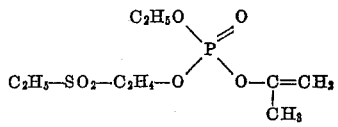

The yield was 97% of the theoretical yield.

EXAMPLE XII

Following the procedure described in Example VIII, but using only 7.5 gm. chlorine, 0.1 mol O-[pyridyl-(4)-mercapto-ethyl] - O - ethyl-O-β,β-dichlorovinyl-phosphate was converted into O-[pyridyl-(4)-sulfoxyl-ethyl]-O-ethyl-O-β,β-dichlorovinyl-phosphate having the structural formula

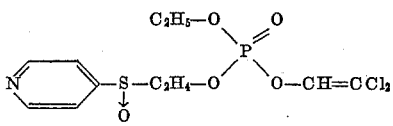

The yield was 95% of the theoretical yield.

EXAMPLE XIII

Following the procedure described in Example VIII, but using only 7.5 gm. chlorine, 0.1 mol S-(phenyl-mercapto-ethyl) - O - ethyl-O-β,β-dichlorovinyl-thiophosphate was converted into S-(phenyl-sulfoxyl-ethyl)-O-ethyl-O-β,β-dichlorovinyl-thiophosphate having the structural formula

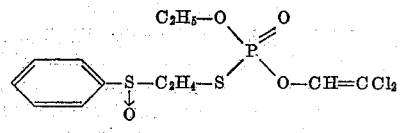

The yield was 90% of the theoretical yield.

The following examples will illustrate how the novel compounds disclosed herein may be compounded as active insecticidal ingredients with various inert carriers to form insecticidal compositions useful in eradicating all types of insects, such flies, mosquitoes, cockroaches, plant lice, beetles, spiders and the like.

EXAMPLE XIV

Dusting powder 2 parts by weight O-(ethyl-sulfoxyl-ethyl)-O-methyl-O-β,β-dichlorovinyl-phosphate were admixed with 98 parts by weight kaolin, and the resulting mixture was milled until homogeneous. The resulting powder was a highly effective insecticidal dusting powder.

EXAMPLE XV

Aqueous suspension 10 parts by weight O-(ethyl-sulfoxyl-ethyl)-O-methyl-O-β,β-dichlorovinyl-phosphate were admixed with 10 parts by weight sodium naphthenate and 80 parts by weight kaolin, and the mixture was milled until it was homogeneous. Thereafter, the homogeneous mixture was admixed with 50 to 200 liters of water and stirred. The resulting suspension was a highly effective insecticidal composition.

EXAMPLE XVI

Aqueous emulsion 50 parts by weight O-(phenyl-sulfoxyl-ethyl)-O-methyl-O-β,β-dichlorovinyl-phosphate were dissolved in 35 parts by weight ricinoleic acid butyl ester sulfonate and the solution was admixed with 15 parts by weight xylene. The resulting solution was emulsified in a suitable amount of water to provide the desired concentration, and just prior to use the insecticidal emulsion formed thereby was diluted with 250 to 1000 liters of water.

EXAMPLE XVII

Spray 5 parts by weight O-(p-chlorophenyl-sulfonyl-ethyl)-O-methyl-O-β,β-dichlorovinyl-phosphate were dissolved in 95 parts by weight petroleum ether. The resulting solution was highly effective insecticidal spray.

EXAMPLE XVIII

Aerosol 5 parts by weight O-(p-chlorophenyl-sulfoxyl-ethyl)-O-ethyl-O-β,β-dichlorovinyl-phosphate were dissolved in 95 parts by weight difluoro-dichloro-methane. The resulting solution was a highly effective insecticidal aerosol composition.

EXAMPLE XIX

Paste 5 gm. O-(p-chlorophenyl-sulfoxyl-ethyl)-O-ethyl-O-β,β-dichlorovinyl-phosphate were stirred with a suitable inert ointment paste until the mixture was homogeneous. The resulting pasty mixture was a highly effective insecticidal paste particularly well adapted for application to surfaces where flies tend to congregate.

EXAMPLE XX 5 gm. O-(p-chlorophenyl-sulfonyl-ethyl)-O-ethyl-O-β,β-dichlorovinyl-phosphate were dissolved in a sufficient amount of benzene, and 100 gm. shredded cellulose were soaked in and thereby impregnated with the solution. Thereafter, the impregnated cellulose chips were heated slightly to drive off the benzene solvent, leaving the active insecticidal ingredient uniformly distributed in the cellulose chips. The impregnated cellulose chips were highly effective in combating cockroaches and other household insects when the chips were scattered on the floor or on other surfaces frequented by such insects.

It will be readily apparent to those skilled in the art that any of the active insecticidal ingredients enumerated in the above examples may also be used in conjunction with any other desired insert carrier, diluent or solvent. For example, another effective way of providing an effective insecticidal composition is to admix the active ingredient with or apply it to a substance which also acts as a bait for insects, such as sugar.

Examples XIV to XX illustrate the use of a limited number of organic phosphoric acid esters represented by the structural Formula I above. It goes without saying that any other phosphoric acid or thiophosphoric acid ester embraced by Formula I may be substituted for the particular active insecticidal ingredient illustrated in Examples XIV to XX. Similarly, various other changes and modifications may be made in the particular embodiments by which the present invention has been illustrated, without departing from the spirit of the invention or the scope of the appended claims.

We claim:

1. Compounds having the general structural formula

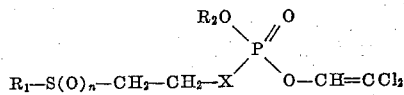

wherein $R_1$ is selected from the group consisting of lower alkyl, phenyl, halogen-substituted phenyl, nitro-substituted phenyl and pyridyl; $R_2$ is alkyl with 1 to 4 carbon atoms; X is selected from the group consisting of oxygen and sulfur; and $n$ is an integer from 1 to 2, inclusive.

2. O - (ethyl - sulfoxyl-ethyl)-O-methyl-O-$\beta,\beta$-dichlorovinyl-phosphate.

3. O - (ethyl - sulfonyl-ethyl)-O-methyl-O-$\beta,\beta$-dichlorovinyl-phosphate.

4. O - (phenyl-sulfoxyl-ethyl)-O-methyl-O-$\beta,\beta$-dichlorovinyl-phosphate.

5. O-(p-chlorophenyl - sulfoxyl - ethyl)-O-ethyl-O-$\beta,\beta$-dichlorovinyl-phosphate.

6. O - (p-chlorophenyl - sulfonyl - ethyl)-O-ethyl-O-$\beta,\beta$-dichlorovinyl-phosphate.

7. O - (p-nitrophenyl - sulfoxyl-ethyl)-O-ethyl-O-$\beta,\beta$-dichlorovinyl-phosphate.

8. O - [pyridyl (4) - sulfoxyl - ethyl]-O-ethyl-O-$\beta,\beta$-dichlorovinyl-phosphate.

9. S - (phenyl - sulfoxyl-ethyl)-O-ethyl-O-$\beta,\beta$-dichlorovinyl-thiophosphate.

10. The method of producing compounds having the general structural formula

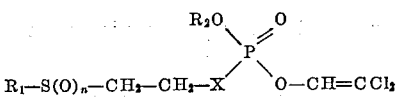

wherein $R_1$ is selected from the group consisting of lower alkyl, phenyl, halogen-substituted phenyl, nitro-substituted phenyl and pyridyl; $R_2$ is alkyl with 1 to 4 carbon atoms; X is selected from the group consisting of oxygen and sulfur; and $n$ is an integer from 1 to 2, inclusive, which comprises oxidizing a phosphorus compound having the structural formula

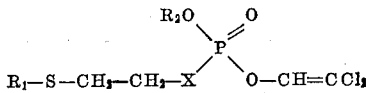

wherein $R_1$, $R_2$, and X have the meaning above defined with an oxidizing agent selected from the group consisting of chlorine, bromine, hypochlorous acid, hypobromous acid, hydrogen peroxide and salts of hypochlorous acid and hypobromous acid, in the presence of water at a temperature between $-20$ and $+20°$ C., the molar ratio of phosphorus compound to oxidizing agent being no greater than 1:2.

References Cited in the file of this patent

UNITED STATES PATENTS 2,791,599     Lane et al. _____ May 7, 1957

OTHER REFERENCES

Fukuto et al.: Journal of Econ. Ent., vol. 48, No. 4, pp. 347–354 (1955).

Barthel et al.: J. Am. Chem. Soc., vol. 77, pp. 2424–7 (1955).